(12) United States Patent
Hayamizu et al.

(10) Patent No.: US 12,458,961 B2
(45) Date of Patent: Nov. 4, 2025

(54) TIN OXIDE MULTILAYER FILM WITH CATALYST LAYER AND METHOD FOR FORMING SAME

(71) Applicant: Panasonic Intellectual Property Management Co., Ltd., Osaka (JP)

(72) Inventors: Masahito Hayamizu, Aichi (JP); Kazuya Shimada, Aichi (JP); Asuka Hirooka, Osaka (JP); Toshihiko Sakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/873,950

(22) PCT Filed: Dec. 27, 2023

(86) PCT No.: PCT/JP2023/046970
§ 371 (c)(1),
(2) Date: Dec. 11, 2024

(87) PCT Pub. No.: WO2024/143480
PCT Pub. Date: Jul. 4, 2024

(65) Prior Publication Data
US 2025/0161928 A1    May 22, 2025

(30) Foreign Application Priority Data
Dec. 28, 2022    (JP) .................................. 2022-212501

(51) Int. Cl.
*B01J 23/14*    (2006.01)
*B01J 23/62*    (2006.01)
(Continued)

(52) U.S. Cl.
CPC .......... *B01J 37/0244* (2013.01); *B01J 23/14* (2013.01); *B01J 23/626* (2013.01);
(Continued)

(58) Field of Classification Search
CPC ...... B01J 23/14; B01J 23/626; B01J 37/0228; B01J 37/0244; C23C 18/1651; C23C 18/1882; C23C 18/42
See application file for complete search history.

(56) References Cited

U.S. PATENT DOCUMENTS 3,883,419 A * 5/1975 Itoh ........................ C10G 35/09
                                                    208/138
5,480,622 A * 1/1996 Narula .................. F01N 3/2803
                                                    502/527.22
(Continued)

FOREIGN PATENT DOCUMENTS

JP    S58-110427 A    7/1983
JP    S59-74270 A     4/1984
(Continued)

OTHER PUBLICATIONS

Mohamed Shaban et al. "Synthesis and Characterization of Tin Oxide thin film, effect of annealing on multilayer film", Journal of Modern Trends in Physics Research, p. 90-99, Dec. 19, 2014.*
(Continued)

*Primary Examiner* — Cam N. Nguyen
(74) *Attorney, Agent, or Firm* — GREENBLUM & BERNSTEIN, P.L.C.

(57) ABSTRACT

A method for forming a tin oxide multilayer film with a catalyst layer, the method including preparing a concentrated liquid in which a tin compound is dissolved in a polar solvent; diluting the concentrated liquid with the polar solvent and a fluoride solution to prepare a reaction liquid that is a stable divalent tin solution; immersing a substance (Continued)

to be treated in the reaction liquid to form a tin oxide layer on a surface of the substance to be treated; and immersing the substance to be treated having the tin oxide layer formed on the surface in a catalyst solution containing catalyst metal ions to form a catalyst layer on the tin oxide layer.

10 Claims, 1 Drawing Sheet

(51) Int. Cl.
  *B01J 37/02* (2006.01)
  *C23C 18/16* (2006.01)
  *C23C 18/18* (2006.01)
  *C23C 18/42* (2006.01)
(52) U.S. Cl.
  CPC ....... *B01J 37/0228* (2013.01); *C23C 18/1651* (2013.01); *C23C 18/1882* (2013.01); *C23C 18/42* (2013.01)

(56) References Cited

U.S. PATENT DOCUMENTS

| | | | | |
|---|---|---|---|---|
| 6,030,517 | A * | 2/2000 | Lincot | C25D 9/04 205/333 |
| 6,669,990 | B2 * | 12/2003 | Min | C30B 29/32 427/255.35 |
| 6,680,517 | B2 * | 1/2004 | Namba | G02F 1/167 252/514 |
| 9,068,112 | B2 * | 6/2015 | Faur | H10F 77/703 |
| 9,561,497 | B2 * | 2/2017 | Kumta | H01M 4/881 |
| 10,041,179 | B2 * | 8/2018 | Kumta | C25B 11/093 |
| 10,435,803 | B2 * | 10/2019 | Kumta | C25B 11/093 |
| 10,526,538 | B2 * | 1/2020 | Faur | H10F 77/211 |
| 11,230,775 | B2 * | 1/2022 | Kumta | C25B 11/051 |
| 11,542,381 | B2 * | 1/2023 | Akaike | C23C 18/2086 |
| 2004/0048740 | A1 * | 3/2004 | Summers | B01J 37/0215 502/302 |
| 2023/0173537 | A1 * | 6/2023 | Kageyama | B05D 1/30 106/286.7 |

FOREIGN PATENT DOCUMENTS

| | | |
|---|---|---|
| JP | S61-186480 A | 8/1986 |
| JP | H3-97873 A | 4/1991 |
| JP | H8-281957 A | 10/1996 |
| JP | 2002-57460 A | 2/2002 |
| JP | 2002-235177 A | 8/2002 |
| JP | 2006-233307 A | 9/2006 |
| JP | 2007-154277 A | 6/2007 |
| JP | 2023-143691 A | 10/2023 |

OTHER PUBLICATIONS

Tadashi Yokoi et al. "Interdiffusion in Platinum-Tin Oxide multilayered films", Journal of Materials Science Letters, vol. 7, p. 669-670, Jun. 1, 1988.*

Bao-Jia Li et al. "Titanium Dioxide-Coated Fluorine-doped Tin Oxide thin films for improving overall photoelectric property", Applied Surface Science, vol. 290, p. 80-85, 2014.*

Takeyuki Suzuki et al. "Effect of Platinum distribution on the hydrogen gas sensor properties in Tin Oxide thin films", Journal of Materials Science Letters 24, p. 2127-2131, 1989.*

Velazquez-Nevarex et al. "Preparation, Characterization and Electronic Properties of Fluorine-doped Tin Oxide Films", Journal of Wuhan University of Technology-Material Science Ed., vol. 31, p. 48-51, Feb. 2016.*

E. Ching-Prado et al. "Optical and electrical properties of fluorine doped tin oxide thin film", Journal of Materials Science: Materials in Electronics, vol. 29, p. 15299-15306, 2018.*

ISR for PCT/JP2023/046970, dated Mar. 26, 2024 (w/ translation).

* cited by examiner

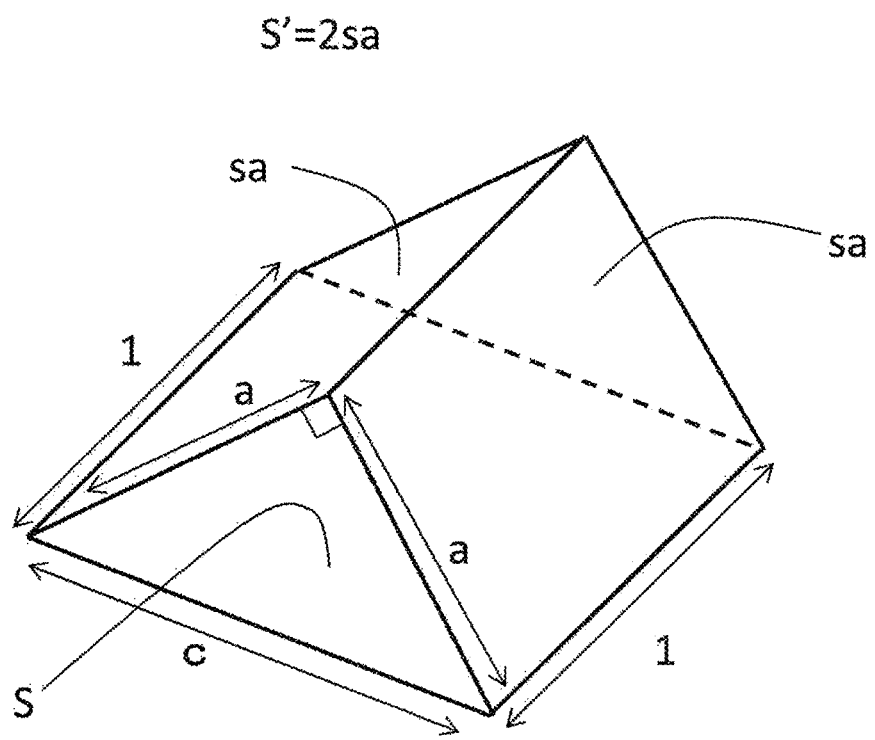

TIN OXIDE MULTILAYER FILM WITH CATALYST LAYER AND METHOD FOR FORMING SAME

TECHNICAL FIELD

The present invention relates to a method for forming a multilayer film in which a tin oxide film is formed on an insulating substrate, such as a resin substrate, a ceramic substrate, a glass substrate, or a silicon substrate, or a metal film is formed on a tin oxide film.

BACKGROUND ART

Conventionally, when electroless plating is applied to a non-conductive substance to be treated, a catalyst such as palladium (Pd) is supported by a surface to be treated, and a metal film is formed. However, an element serving as the catalyst is only disposed on the surface to be treated, and therefore the adhesiveness of the formed metal film is low.

As a countermeasure against this, the surface to be treated of the non-conductor is subjected to a process called a pre-treatment for electroless plating. In this process, a sensitizer treatment (sensitization treatment) for forming a metal oxide film and an activation treatment (activation treatment) for forming a catalyst on the metal oxide film are performed.

As the metal oxide film, zinc oxide is easily handled and is often used, but has a problem in that its resistance to chemicals is very low. Consequently, it has become common for tin to be used as the metal oxide film.

Patent Literature 1 discloses that a sensitizer treatment is performed by immersing a substrate in a tin (II) chloride solution and then immersing the substrate in hydrofluoric acid or an aqueous solution of fluoride salt and that an activation treatment is subsequently performed by immersing the substrate in a solution of a salt of palladium (Pd), silver (Ag), or gold (Au).

There is a disclosure stating that the same effect is obtained even when hydrofluoric acid or a fluoride solution is mixed with a tin (II) chloride solution in the sensitizer treatment.

Patent Literature 2 discloses the use of a mixed solution of $SnF_2$ and HF in a sensitizer treatment.

CITATION LIST

Patent Literature

PTL 1: Japanese Patent Application Laid-Open No. Sho. 59-074270
PTL 2: Japanese Patent Application Laid-Open No. Hei. 08-281957

SUMMARY OF INVENTION

Technical Problem

In the sensitizer treatments, a substance to be treated is immersed in a divalent tin source for several minutes, and therefore a layer of tin oxide is extremely thin and scattered. Also, a catalyst activated with the layer of tin oxide has a low density. Furthermore, a metal film formed by electroless plating as a surface treatment in such circumstances is likely to be uneven and has a low adhesive force.

The cause of the unevenness of the catalyst layer is considered to be the following. A catalyst metal is initially reduced by SnO that is a divalent tin compound in a tin oxide film, and as a result, is supported on the tin oxide film. However, when a tin compound is dissolved in an aqueous solution to obtain divalent tin ions, the divalent tin ions are oxidized into tetravalent tin ions by dissolved oxygen in water serving as a medium, forming $SnO_2$. $SnO_2$, which has tetravalent tin ions, is not reductive, and the catalyst metal cannot be supported on the tin oxide film. It is considered that this $SnO_2$ is incorporated into the tin oxide film and subsequent support by reduction of the catalyst metal cannot be achieved.

Furthermore, divalent tin ions are oxidized and precipitated as $SnO_2$ in an aqueous solution. Then, $SnO_2$ is attached as precipitate lumps onto the surface to be treated. As a result, the uniformity deteriorates when supporting the catalyst metal. This phenomenon is also the cause of unevenness of the catalyst layer.

Furthermore, there is also a problem in that the precipitated $SnO_2$ is incorporated into an oxide film formed on the surface to be treated and becomes a nucleus for film growth, abruptly increasing the film growth rate and making the oxide film thickness significantly difficult to control.

Solution to Problem

The inventors of the present invention have performed intensive studies, and as a result, found, by suppressing the occurrence of tetravalent tin ions during the formation of tin oxide layer and thus forming a thicker tin oxide layer, a tin oxide multilayer film including a tin oxide layer and a catalyst layer that is disposed on the tin oxide layer without unevenness, and also found a method for forming such a tin oxide multilayer film.

More specifically, a tin oxide multilayer film with a catalyst layer according to the present invention includes
  a tin oxide layer formed on a surface of an insulator, and
  a catalyst layer formed on the tin oxide layer,
  the tin oxide layer having a thickness of 2 nm or more and 60 nm or less.

A method for forming the tin oxide multilayer film with a catalyst layer according to the present invention includes steps of:
  preparing a concentrated liquid in which a tin compound is dissolved in a polar solvent;
  diluting the concentrated liquid with the polar solvent and a fluoride solution to prepare a reaction liquid that is a stable divalent tin solution;
  immersing a substance to be treated in the reaction liquid to form a tin oxide layer on a surface of the substance to be treated; and
  immersing the substance to be treated having the tin oxide layer formed on the surface in a catalyst solution containing catalyst metal ions to form a catalyst layer on the tin oxide layer.

Further, the method for forming the tin oxide multilayer film with a catalyst layer according to the present invention may include steps of:
  preparing a concentrated liquid in which tin (II) chloride is dissolved in a fluoride solution having a fluorine ion concentration of 0.3 M or more;
  diluting the concentrated liquid or adding the fluoride solution to prepare a reaction liquid that is a stable divalent tin solution;
  immersing a substance to be treated in the reaction liquid to form a tin oxide layer on a surface of the substance to be treated; and immersing the substance to be treated having the tin oxide layer formed on the surface in a catalyst solution that contains catalyst metal ions to form a catalyst layer on the tin oxide layer.

Advantageous Effects of Invention

The tin oxide multilayer film with a catalyst layer according to the present invention is thick with a film thickness of 2 nm or more and 60 nm or less, and therefore the supported amount of the catalyst is also large. Accordingly, unevenness is unlikely to occur, and the adhesion force thereof to a surface to be treated of an electroless plating film formed on the tin oxide multilayer film is also high.

The tin oxide multilayer film with a catalyst layer according to the present invention has a sufficient thickness for having a cross section examined with a transmission electron microscope (TEM) and also has a developed interfacial area ratio (Sdr) of 0 or more and less than $1\times10^{-4}$, and therefore the catalyst layer can be wide and uniform.

In the formation method according to the present invention, a stable divalent tin solution is prepared, and therefore a thick and uniform tin oxide layer can be formed even by a prolonged treatment.

BRIEF DESCRIPTION OF DRAWINGS

FIG. 1 is a view illustrating a developed interfacial area ratio.

DESCRIPTION OF EMBODIMENTS

Hereinafter, a method for forming a tin oxide multilayer film with a catalyst layer according to the present invention will be described with reference to the drawing and Examples. The following description is an example of one embodiment of the present invention, and the present invention is not limited to the following description. The following description can be modified without departing from the spirit of the present invention. In the following description, "upward" refers to a direction away from a surface to be treated that is a base, and "downward" refers to a direction toward the surface to be treated.

The method for forming a tin oxide multilayer film with a catalyst layer of the present invention includes steps of:
preparing a concentrated liquid in which a tin compound is dissolved in a polar solvent;
diluting the concentrated liquid with the polar solvent and a fluoride solution to prepare a reaction liquid that is a stable divalent tin solution;
immersing a substance to be treated in the reaction liquid to form a tin oxide layer on a surface of the substance to be treated; and
immersing the substance to be treated having the tin oxide layer formed on the surface in a catalyst solution that contains catalyst metal ions to form a catalyst layer on the tin oxide layer.

<Substance to be Treated>

Examples of the substance to be treated include an insulator, and an insulator having a surface on which a metal layer is formed in advance. Specifically, a material such as a resin, ceramics, glass, or silicon may be used.

As a resin, a polyimide resin, a methacrylic resin, an epoxy resin, a liquid crystal polymer, a polycarbonate resin, or a fluorine-containing resin such as PFA, PTFE, or ETFE may be suitably used. Furthermore, the resin may contain glass fibers in order to enhance mechanical strength.

As ceramics, aluminum oxide such as alumina or sapphire, aluminum nitride, silicon nitride, silicon carbide, zirconium oxide, yttrium oxide, titanium nitride, barium titanate, or the like may be suitably used.

Glass is an amorphous substrate including a silica network, and may contain a network former (network-forming oxide) of aluminum, boron, phosphorus, or the like, or a network modifier (network-modifying oxide) of alkali metal, alkaline earth metal, magnesium, or the like.

As silicon, single crystal silicon or polycrystalline silicon may be suitably used.

<Surface to be Treated>

The surface to be treated is the surface of the substance to be treated, and may be a recess, a hole, or an inner wall of a through hole that is formed on the surface of the substance to be treated as long as the liquid material can reach such a surface. As a matter of course, the surface to be treated is a portion where a metal film is to be formed.

<Divalent Tin Compound>

As a divalent tin compound containing no fluorine, tin (II) chloride, tin sulfate, or tin nitrate may be suitably used. A tin compound containing fluorine or another element may be contained as long as these tin compounds are contained. The divalent tin compound may be used in an amount ranging from 0.01 Mol to 1.0 Mol, more suitably from 0.025 Mol to 0.5 Mol, and the most preferably from 0.05 Mol to 0.25 Mol.

<Fluoride>

As a fluoride, hydrofluoric acid (HF), ammonium hydrogen fluoride (($NH_4$) $HF_2$), or ammonium fluoride ($NH_4F$) may be suitably used. When only a fluoride other than these fluorides is used, a catalyst layer having a uniform surface state cannot be obtained. The concentration of the fluoride in a state of a final reaction liquid may be 0.01 Mol to 2.5 Mol, more suitably 0.025 Mol to 2.0 Mol, and the most preferably 0.05 Mol to 1.0 Mol. In general, a fluorine amount sufficient to completely dissolve 1 mmol/L or more of divalent tin ion in the entire reaction liquid is required.

<Solvent>

As a solvent, water and/or a polar solvent may be suitably used. Furthermore, the solvent may be water containing a chelating agent. Herein, as the polar solvent, an alcohol such as ethanol, a carboxylic acid such as acetic acid, a ketone such as acetone, or the like may be suitably used.

<Stable Divalent Tin Solution>

In the present invention, a stable divalent tin solution is used. In the present invention, a tin oxide layer that is much thicker is formed, compared to the metal oxide layer obtained on the surface to be treated by a sensitizer treatment or the like. In this case, the substance to be treated needs to be immersed in a treatment liquid for an extended period of time. Therefore, a reaction liquid in which a substance containing tin is not precipitated during the immersion is required. Even when a precipitate is not generated, the oxidation of divalent tin into tetravalent tin results in a failure to support the catalyst layer by adsorption. Therefore, a reaction liquid in which divalent tin is stable for an extended period of time is required. This reaction liquid is referred to as a stable divalent tin solution.

When a divalent tin source is initially dissolved in water, the divalent tin source is oxidized into tetravalent tin by dissolved oxygen in water, and tin (IV) oxide is precipitated, possibly clouding the solution. To avoid this issue, divalent tin can be dissolved in a polar solvent containing no dissolved oxygen to obtain a stable divalent tin solution. In this case, however, a salt of divalent tin that can be dissolved in the polar solvent is required.

Herein, "containing no dissolved oxygen" means that the dissolved oxygen amount is 0.5 mg/L or less. Although the substrate is immersed in the solution during the formation of the film, the liquid surface is also preferably subjected to an oxygen avoidance means such as nitrogen purging in order to avoid contact with air.

The applicant confirmed that tin (II) chloride can be dissolved in water, ethanol, methanol, or acetone. In addition, tin acetate is dissolved in ethanol.

Next, by adding a fluoride in advance to water containing dissolved oxygen and then adding divalent tin, the stable divalent tin solution can be obtained. Even when tin (II) chloride is dissolved in water, the stable divalent tin solution can be obtained by adding a fluoride or a fluoroborate immediately afterwards. However, a fluoride being added in advance is more desirable as seen from Examples described below. This is because it is preferable for the time period from when divalent tin is associated with water to when it reacts with a fluoride to be short.

From Examples described below, the fluorine concentration of a fluoride solution with which tin (II) chloride is initially associated is preferably 0.3 M or more, and more preferably 0.5 M or more. If tin(II) chloride that is initially associated with a fluoride solution with a high concentration is diluted, the stabilization time can be elongated and the surface roughness can be reduced. In other words, a developed interfacial area ratio described below can be reduced. On the other hand, when the fluorine concentration of the fluoride solution that is initially associated with tin (II) chloride is low, the surface of the formed tin oxide film becomes rough. That is, the developed interfacial area ratio becomes large.

In addition, it is desirable that the fluorine concentration of the fluoride solution that is initially associated with tin (II) chloride be 0.8 times or more, and 3 times or less, than the tin concentration. When the tin concentration is higher than the fluorine concentration or the fluorine concentration is much higher than the tin concentration, an oxide film is not formed, or if formed, the surface roughness deteriorates (the developed interfacial area ratio is increased).

A developed interfacial area ratio Sdr described below in detail refers to an evaluation method of indicating the unevenness of a catalyst layer. The unevenness of a catalyst layer is influenced by the surface property of the tin oxide layer, and the surface property of the tin oxide layer is considered to be mainly caused by tetravalent tin that will be oxidized by dissolved oxygen. Therefore, the developed interfacial area ratio Sdr is considered to be enough to suppress the production of tetravalent tin during formation of the oxide film. Accordingly, a reaction liquid in which the developed interfacial area ratio of the catalyst layer on an oxide film formed after a film formation period lasing 4 hours (corresponds to a thickness of the tin oxide film of 40 to 60 nm) is less than $1 \times 10^{-4}$ may be the "stable divalent tin solution".

<Catalyst Metal>

As a catalyst metal, noble metal such as palladium, platinum, gold, or silver may be suitably used. A solution of catalyst metal refers to a catalyst solution. For example, when a catalyst is palladium, a catalyst solution having a concentration of preferably 0.005 g/L to 1 g/L, more preferably 0.05 g/L to 1.0 g/L, and the most preferably 0.1 g/L to 1.0 g/L may be suitably used. More specifically, when the catalyst metal is palladium, electroless plating at a concentration of 0.005 g/L to 1.0 g/L is possible. However, when the catalyst metal is silver, electroless plating requires a concentration of 0.05 g/L to 1.0 g/L.

<Film Formation Condition>

In the present invention, the formation of each of the tin oxide layer and the catalyst layer is suitably performed at 30° C. to 50° C. The tin oxide layer may be formed for a tin oxide layer-forming time (may also be referred to as a treatment time) of 1 to 6 hours so that the thickness thereof is 2 nm to 60 nm. When the thickness is increased, the unevenness is reduced, and because of the divalent tin ions in the film, a great quantity of catalyst atoms are adsorbed and are strongly supported on the surface of the tin oxide layer. The catalyst layer may be formed at normal temperature over a period of about 2 to 4 minutes.

<Tin Oxide Multilayer Film>

A tin oxide multilayer film includes the tin oxide layer formed on the surface to be treated and the catalyst layer formed on the tin oxide layer. The thickness of the tin oxide layer is 2 nm to 60 nm. The cross section of the tin oxide layer can be clearly observed with TEM. That is, a thickness of 2 nm is the limit of what can be examined with TEM. In the catalyst layer, the presence of a catalyst atom can be detected by mass spectrometry or the like, but is not recognized by cross-section observation. The formation time is short, and therefore the catalyst layer is considered to be almost completely isolated fragments. However, in the description, a catalyst portion that is formed in order on the surface to be treated is also referred to as "layer".

<Developed Interfacial Area Ratio>

The catalyst layer is supported on the surface of the tin oxide multilayer film, but the catalyst layer has a thickness of about 0.2 to 0.5 nm and is in a state with almost completely isolated fragments. However, when the catalyst layer is formed on the tin oxide layer in a size corresponding to a general slide glass (26 mm×76 mm), the catalyst layer is colored, and thus the uniformity can be visually observed. From the indication of the surface roughness and the results of visual check, it has been seen that the developed interfacial area ratio (Sdr) is suitable for judging uniformity.

The developed interfacial area ratio (Sdr) is an indication for an increase in actual surface area with respect to the area of a defined region, and is also defined by ISO25178. Intuitively, consider the cross-section of a right-angled isosceles triangle with the hypotenuse as its base, as shown in FIG. 1. The depth is 1, sides forming the right angle are a, and the base is c. In this case, when the area of one inclined plane is sa (sa·1=2a), the area S' of a slope is 2sa, and the area S of the bottom surface is c·1=(c). Then, Sdr is determined by Expression (1).

[Expression 1]

$$Sdr = \frac{S' - S}{S} \qquad (1)$$

Therefore, in a case of a 45° inclined plane, a square root of 2 is assigned to c and 1 is assigned to a. Then, Sdr is 0.414. When the area of a portion of the inclined plane is not increased with respect to a reference plane (in this case, the area S) (when S'=S), Sdr is 0. More specifically, Sdr is represented by the following expression (2).

[Expression 2]

$$Sdr = \frac{1}{A}\left[\int\int_A \left(\sqrt{\left[1 + \left(\frac{\partial z(x,y)}{\partial x}\right)^2 + \left(\frac{\partial z(x,y)}{\partial y}\right)^2\right]} - 1\right) dx dy\right] \qquad (2)$$

In this expression, x and y represent the length and width, respectively, of a sample, and z represents a thickness direction.

In the case of this indication, a state that can be visually judged as suitable was determined to be at Sdr of less than $1 \times 10^{-4}$. The indication is based on the premise that a film is formed, and whether a film is formed is visually judged. If a film is not formed, since the surface to be treated is measured, Sdr is 0.

When the surface to be treated is porous like ceramics, Sdr of the surface to be treated by itself is not 0, and evaluation by Sdr is not applied to such a case. When the formed surface to be treated is a mirror plane, evaluation by Sdr is applied.

EXAMPLES

The following describes examples of the tin oxide multilayer film with a catalyst layer according to the present invention.

A reaction liquid was prepared using tin(II) chloride and hydrofluoric acid, and an oxide film was formed on a glass substrate. Pd was formed as a catalyst layer on the oxide film, and the developed interfacial area ratio (Sdr) of the surface was measured.

Tin(II) chloride was dissolved in approximately 80 ml of a high-concentration fluorine solution to prepare 100 ml of a concentrated liquid. Next, water and/or 55% HF was added to this concentrated liquid to prepare 40 ml of a reaction liquid of a predetermined concentration. A stable divalent tin solution could be obtained as the reaction liquid by associating fluorine elements at a high concentration with divalent tin elements.

After this reaction liquid was adjusted to a reaction temperature (50° C. to 60° C.), the glass substrate was immersed in the reaction liquid and held for a layer formation time (4 hours). The thickness of a tin oxide layer thus formed was about 40 nm. The glass substrate was then removed and immersed in a catalyst liquid to form a catalyst layer. The catalyst liquid used to form the catalyst layer was a 100-ppm solution of palladium (Pd). The catalyst layer was formed for 2 minutes.

After the catalyst layer was formed and dried, Sdr was measured using a laser microscope. The VK-X1100 series laser microscope manufactured by Keyence Corp. was used to measure the surface after the catalyst layer was formed. The measurement conditions were as follows: the magnification was 1200×, the measurement area was divided into four, and the Sdr of each divided area was calculated to determine the average value. Sdr was measured at two sites on each sample, and the average value was taken as the average Sdr value for the sample. By comparing the developed interfacial area ratio Sdr with the visual evaluation of the unevenness of the catalyst layer, Sdr of $1 \times 10^{-4}$ or more was determined to be uneven, and Sdr of less than $1 \times 10^{-4}$ was determined to be even.

The preparation methods of examples and comparative examples are described below. Furthermore, Table 1 and Table 2 show these preparation methods and the Sdr values measured after the film formation. Furthermore, the following materials were used. Hydrofluoric acid (HF) was used at a concentration of 55% (density 1.2 g/ml). Tin(II) chloride ($SnCl_2$) was used as a dihydrate (molecular weight 226.65) with a purity of 97%. Tin(II) fluoride ($SnF_2$: molecular weight 156.71) was used with a purity of 90%. Tin(II) tetrafluoroborate ($Sn(BF_4)_2$: molecular weight 292.3) was used with a purity of 50%. Ammonium hydrogen difluoride ($NH_4HF_2$: molecular weight 57.04) was used with a purity of 97%.

Example 1: 1.53 ml of 55% HF was added to 80 ml of pure water and stirred to obtain a hydrofluoric acid solution. The concentration of the hydrofluoric acid solution is 0.62 M. The fluorine concentration at this time is the fluorine concentration at which tin ions initially associate with fluorine. Next, 11.6 g of tin(II) chloride was added to this hydrofluoric acid solution and dissolved. Then, pure water was added to adjust the total volume to 100 ml, thereby obtaining a concentrated liquid 1. This concentrated liquid 1 has a fluorine concentration of 0.50 M and a tin concentration of 0.50 M.

Next, 35 ml of pure water was added to 5 ml of the concentrated liquid 1 to obtain 40 ml of a reaction liquid. The reaction liquid had a fluorine concentration of 63.1 mM and a tin concentration of 62.3 mM.

Example 2: 0.77 ml of 55% HF was added to 80 ml of pure water and stirred to obtain a hydrofluoric acid solution. The concentration of the hydrofluoric acid solution is 0.31 M. The fluorine concentration at this time is the fluorine concentration at which tin ions initially associate with fluorine. Next, 5.8 g of tin(II) chloride was added to this hydrofluoric acid solution and dissolved. Then, pure water was added to adjust the total volume to 100 ml, thereby obtaining a concentrated liquid 2. This concentrated liquid 2 has a fluorine concentration of 0.25 M and a tin concentration of 0.25 M.

Next, 36 ml of pure water was added to 4 ml of the concentrated liquid 2 to obtain 40 ml of a reaction liquid. The reaction liquid had a fluorine concentration of 25.4 mM and a tin concentration of 24.9 mM.

Example 3: 6.05 ml of 55% HF was added to 80 ml of pure water and stirred to obtain a hydrofluoric acid solution. The concentration of the hydrofluoric acid solution is 2.32 M. The fluorine concentration at this time is the fluorine concentration at which tin ions initially associate with fluorine. Next, 46.5 g of tin(II) chloride was added to this hydrofluoric acid solution and dissolved. Then, pure water was added to adjust the total volume to 100 ml, thereby obtaining a concentrated liquid 3. This concentrated liquid 3 has a fluorine concentration of 2.00 M and a tin concentration of 2.00 M.

Next, 36 ml of pure water was added to 4 ml of the concentrated liquid 3 to obtain 40 ml of a reaction liquid. The reaction liquid had a fluorine concentration of 199.6 mM and a tin concentration of 199.9 mM.

Example 4: 12.1 ml of 55% HF was added to 80 ml of pure water and stirred to obtain a hydrofluoric acid solution. The concentration of the hydrofluoric acid solution is 4.33 M. The fluorine concentration at this time is the fluorine concentration at which tin ions initially associate with fluorine. Next, 45 g of tin(II) chloride was added to this hydrofluoric acid solution and dissolved. Then, pure water was added to adjust the total volume to 100 ml, thereby obtaining a concentrated liquid 4. This concentrated liquid 4 has a fluorine concentration of 3.99 M and a tin concentration of 1.93 M.

Next, 34 ml of pure water was added to 6 ml of the concentrated liquid 4 to obtain 40 ml of a reaction liquid. The reaction liquid had a fluorine concentration of 598.7 mM and a tin concentration of 2902.0 mM.

Example 5: 12.1 ml of 55% HF was added to 80 ml of pure water and stirred to obtain a hydrofluoric acid solution. The concentration of the hydrofluoric acid solution is 4.33 M. The fluorine concentration at this time is the fluorine concentration at which tin ions initially associate with fluorine. Next, 45 g of tin(II) chloride was added to this hydrofluoric acid solution and dissolved. Then, pure water was added to adjust the total volume to 100 ml, thereby obtaining a concentrated liquid 4. This concentrated liquid 4 has a fluorine concentration of 3.99 M and a tin concentration of 1.93 M.

Next, 15 ml of pure water was added to 25 ml of the concentrated liquid 4 to obtain 40 ml of a reaction liquid. The reaction liquid had a fluorine concentration of 2494.4 mM (about 2.5 M) and a tin concentration of 1209.0 mM (about 1.2 M).

Example 6: 1.53 ml of 55% HF was added to 80 ml of pure water and stirred to obtain a hydrofluoric acid solution. The concentration of the hydrofluoric acid solution is 0.62 M. The fluorine concentration at this time is the fluorine concentration at which tin ions initially associate with fluorine. Next, 11.6 g of tin(II) chloride was added to this hydrofluoric acid solution and dissolved. Then, pure water was added to adjust the total volume to 100 ml, thereby obtaining a concentrated liquid 5. This concentrated liquid 5 has a fluorine concentration of 0.50 M and a tin concentration of 0.50 M.

Next, 39.2 ml of pure water was added to 0.8 ml of the concentrated liquid 5 to obtain 40 ml of a reaction liquid. The reaction liquid had a fluorine concentration of 10.1 mM and a tin concentration of 10.0 mM.

Example 7: 1.53 ml of 55% HF was added to 80 ml of pure water and stirred to obtain a hydrofluoric acid solution. The concentration of the hydrofluoric acid solution is 0.62 M. The fluorine concentration at this time is the fluorine concentration at which tin ions initially associate with fluorine. Next, 3.9 g of tin(II) chloride was added to this hydrofluoric acid solution and dissolved. Then, pure water was added to adjust the total volume to 100 ml, thereby obtaining a concentrated liquid 6. This concentrated liquid 6 has a fluorine concentration of 0.50 M and a tin concentration of 0.17 M.

Next, 39.2 ml of pure water was added to 0.8 ml of the concentrated liquid 6 to obtain 40 ml of a reaction liquid. The reaction liquid had a fluorine concentration of 10.1 mM and a tin concentration of 3.4 mM. The fluorine concentration of the reaction liquid is less than three times the tin concentration.

Example 8: 9.06 ml of 55% HF was added to 80 ml of pure water and stirred to obtain a hydrofluoric acid solution. The concentration of the hydrofluoric acid solution is 3.36 M. The fluorine concentration at this time is the fluorine concentration at which tin ions initially associate with fluorine. Next, 24 g of tin(II) chloride was added to this hydrofluoric acid solution and dissolved. Then, pure water was added to adjust the total volume to 100 ml, thereby obtaining a concentrated liquid 7. This concentrated liquid 7 has a fluorine concentration of 2.99 M and a tin concentration of 1.03 M.

Next, 39.0 ml of pure water was added to 1 ml of the concentrated liquid 7 to obtain 40 ml of a reaction liquid. The reaction liquid had a fluorine concentration of 74.7 mM and a tin concentration of 25.8 mM. The fluorine concentration of the reaction liquid is less than three times the tin concentration.

Example 9: 3.06 ml of 55% HF was added to 80 ml of pure water and stirred to obtain a hydrofluoric acid solution. The concentration of the hydrofluoric acid solution is 1.22 M. The fluorine concentration at this time is the fluorine concentration at which tin ions initially associate with fluorine. Next, 28 g of tin(II) chloride was added to this hydrofluoric acid solution and dissolved. Then, pure water was added to adjust the total volume to 100 ml, thereby obtaining a concentrated liquid 8. This concentrated liquid 8 has a fluorine concentration of 1.01 M and a tin concentration of 1.20 M.

Next, 39.0 ml of pure water was added to 1 ml of the concentrated liquid 8 to obtain 40 ml of a reaction liquid. The reaction liquid had a fluorine concentration of 25.2 mM and a tin concentration of 30.1 mM. The fluorine concentration of the reaction liquid is more than 0.8 times the tin concentration.

Example 10: 2.51 ml of 55% HF was added to 80 ml of pure water and stirred to obtain a hydrofluoric acid solution. The concentration of the hydrofluoric acid solution is 1.00 M. The fluorine concentration at this time is the fluorine concentration at which tin ions initially associate with fluorine. Next, 29 g of tin(II) chloride was added to this hydrofluoric acid solution and dissolved. Then, pure water was added to adjust the total volume to 100 ml, thereby obtaining a concentrated liquid 9. This concentrated liquid 9 has a fluorine concentration of 0.83 M and a tin concentration of 1.25 M.

Next, 0.013 ml of 55% HF and pure water were further added to 1 ml of the concentrated liquid 9 to obtain a reaction liquid of 40 ml in total. The reaction liquid had a fluorine concentration of 31.4 mM and a tin concentration of 31.2 mM.

Example 11: 23.2 g of tin(II) chloride was added to 80 ml of ethanol and dissolved. Then, ethanol was further added to adjust the total volume to 100 ml, thereby obtaining a concentrated liquid 10. This concentrated liquid 10 has a fluorine concentration of 0 M and a tin concentration of 1.00 M.

Next, 0.032 ml of 55% HF and pure water were further added to 1 ml of the concentrated liquid 10 to obtain a reaction liquid of 40 ml in total. The reaction liquid had a fluorine concentration of 26.4 mM and a tin concentration of 24.9 mM.

Example 12: 23.2 g of tin(II) chloride was added to 80 ml of ethanol and dissolved. Then, ethanol was further added to adjust the total volume to 100 ml, thereby obtaining a concentrated liquid 10. This concentrated liquid 10 has a fluorine concentration of 0 M and a tin concentration of 1.00 M.

Next, 0.09 ml of 55% HF and pure water were further added to 1 ml of the concentrated liquid 10 to obtain a reaction liquid of 40 ml in total. The reaction liquid had a fluorine concentration of 74.2 mM and a tin concentration of 24.9 mM. The fluorine concentration of the reaction liquid is less than 3 times the tin concentration.

Example 13: 23.2 g of tin(II) chloride was added to 80 ml of ethanol and dissolved. Then, ethanol was further added to adjust the total volume to 100 ml, thereby obtaining a concentrated liquid 10. This concentrated liquid 10 has a fluorine concentration of 0 M and a tin concentration of 1.00 M.

Next, 0.025 ml of 55% HF and pure water were further added to 1 ml of the concentrated liquid 10 to obtain a reaction liquid of 40 ml in total. The reaction liquid had a fluorine concentration of 20.6 mM and a tin concentration of 24.9 mM. The fluorine concentration of the reaction liquid is more than 0.8 times the tin concentration.

Example 14: 3.06 ml of 55% HF was added to 80 ml of pure water and stirred to obtain a hydrofluoric acid solution. The concentration of the hydrofluoric acid solution is 1.22 M. The fluorine concentration at this time is the fluorine concentration at which tin ions initially associate with fluorine. Next, 13.96 g of tin(II) chloride and 23.4 g of $Sn(BF_4)_2$ were added to this hydrofluoric acid solution and dissolved. Then, pure water was added to adjust the total volume to 100 ml, thereby obtaining a concentrated liquid 11. This concentrated liquid 11 has a fluorine concentration of 1.01 M and a tin concentration of 1.00 M.

Next, 35.0 ml of pure water was added to 5 ml of the concentrated liquid 11 to obtain 40 ml of a reaction liquid. The reaction liquid had a fluorine concentration of 126.2 mM and a tin concentration of 50.0 mM.

Example 15: 2.94 g of $NH_4HF_2$ with a purity of 97% was added to 80 ml of pure water and stirred to obtain a fluoride solution. The fluoride solution has a fluorine concentration of 1.25 M. The fluorine concentration at this time is the fluorine concentration (2.50 M) at which tin ions initially associate with fluorine. Next, 23.2 g of tin(II) chloride was added to this hydrofluoric acid solution and dissolved. Then, pure water was added to adjust the total volume to 100 ml, thereby obtaining a concentrated liquid 12. This concentrated liquid 12 has a fluorine concentration of 1.00 M and a tin concentration of 1.00 M.

Next, 35.0 ml of pure water was added to 5 ml of the concentrated liquid 12 to obtain 40 ml of a reaction liquid. The reaction liquid had a fluorine concentration of 125.0 mM and a tin concentration of 124.7 mM.

Comparative example 1: 0.7 ml of 55% HF was added to 80 ml of pure water and stirred to obtain a fluoride solution. The fluoride solution has a fluorine concentration of 0.29 M. The fluorine concentration at this time is the fluorine concentration at which tin ions initially associate with fluorine. Next, 5.3 g of tin(II) chloride was added to this hydrofluoric acid solution and dissolved. Then, pure water was added to adjust the total volume to 100 ml, thereby obtaining a comparative example concentrated liquid 1. This comparative example concentrated liquid 1 has a fluorine concentration of 0.23 M and a tin concentration of 0.23 M.

Next, 29.6 ml of pure water was added to 10.4 ml of the comparative example concentrated liquid 1 to obtain 40 ml of a reaction liquid. The reaction liquid had a fluorine concentration of 60.0 mM and a tin concentration of 59.2 mM.

Comparative example 2: 0.7 ml of 55% HF was added to 80 ml of pure water and stirred to obtain a fluoride solution. The fluoride solution has a fluorine concentration of 0.26 M. The fluorine concentration at this time is the fluorine concentration at which tin ions initially associate with fluorine. Next, 5.3 g of tin(II) chloride was added to this hydrofluoric acid solution and dissolved. Then, pure water was added to adjust the total volume to 100 ml, thereby obtaining a comparative example concentrated liquid 1. This comparative example concentrated liquid 1 has a fluorine concentration of 0.23 M and a tin concentration of 0.23 M.

Next, 38.2 ml of pure water was added to 1.8 ml of the comparative example concentrated liquid 1 to obtain 40 ml of a reaction liquid. The reaction liquid had a fluorine concentration of 10.4 mM and a tin concentration of 10.3 mM.

Comparative example 3: 0.7 ml of 55% HF was added to 80 ml of pure water and stirred to obtain a fluoride solution. The fluoride solution has a fluorine concentration of 0.29 M. The fluorine concentration at this time is the fluorine concentration at which tin ions initially associate with fluorine. Next, 5.3 g of tin(II) chloride was added to this hydrofluoric acid solution and dissolved. Then, pure water was added to adjust the total volume to 100 ml, thereby obtaining a comparative concentrated liquid 1. This comparative example concentrated liquid 1 has a fluorine concentration of 0.23 M and a tin concentration of 0.23 M.

Next, 5.5 ml of pure water was added to 34.5 ml of the comparative example concentrated liquid 1 to obtain 40 ml of a reaction liquid. The reaction liquid had a fluorine concentration of 199.1 mM and a tin concentration was 196.5 mM.

Comparative example 4: 1.53 ml of 55% HF was added to 80 ml of pure water and stirred to obtain a fluoride solution. The fluoride solution has a fluorine concentration of 0.62 M. The fluorine concentration at this time is the fluorine concentration at which tin ions initially associate with fluorine. Next, 11.6 g of tin(II) chloride was added to this hydrofluoric acid solution and dissolved. Then, pure water was added to adjust the total volume to 100 ml, thereby obtaining a comparative example concentrated liquid 2. This comparative example concentrated liquid 2 has a fluorine concentration of 0.50 M and a tin concentration of 0.50 M.

Next, 39.36 ml of pure water was added to 0.64 ml of the comparative example concentrated liquid 2 to obtain 40 ml of a reaction liquid. The reaction liquid had a fluorine concentration of 8.2 mM and a tin concentration of 8.1 mM.

Comparative example 5: 58.5 g of tin(II) tetrafluoroborate $(Sn(BF_4)_2)$ was added to 80 ml of pure water and stirred to obtain a fluoride solution. The boron fluoride concentration of the fluoride solution is about 2.5 M. The tin ion concentration in this tin fluoroborate solution is about 1.25 M. Then, pure water was added to adjust the total volume to 100 ml, thereby obtaining a comparative example concentrated liquid 3. This comparative example concentrated liquid 3 has a boron fluoride concentration of 1.60 M and a tin concentration of 1.00 M.

Next, 35.0 ml of pure water was added to 5 ml of the comparative example concentrated liquid 3 to obtain 40 ml of a reaction liquid. The reaction liquid had a fluorine concentration of 200.1 mM and a tin concentration of 125.1 mM.

Comparative example 6: 12.1 ml of 55% HF was added to 80 ml of pure water and stirred to obtain a fluoride solution. The fluoride solution has a fluorine concentration of 4.33 M. The fluorine concentration at this time is the fluorine concentration at which tin ions initially associate with fluorine. Next, 45 g of tin(II) chloride was added to this hydrofluoric acid solution and dissolved. Then, pure water was added to adjust the total volume to 100 ml, thereby obtaining a comparative example concentrated liquid 4. This comparative example concentrated liquid 4 has a fluorine concentration of 3.99 M and a tin concentration of 1.93 M.

Next, 12 ml of pure water was added to 28 ml of the comparative example concentrated liquid 4 to obtain 40 ml of a reaction liquid. The reaction liquid had a fluorine concentration of 2793.7 mM and a tin concentration of 1354.1 mM.

Comparative example 7: 23.2 g of tin(II) chloride was added to 80 ml of pure water and dissolved. Then, pure water was added to adjust the total volume to 100 ml, thereby obtaining a comparative example concentrated liquid 5. This comparative example concentrated liquid 5 has a fluorine concentration of 0 M and a tin concentration of 1.00 M. That is, in Comparative Example 7, tin was dissolved in pure water without associating with the high-concentration fluoride solution.

Next, 0.032 ml of 55% HF and pure water were added to 1 ml of the comparative example concentrated liquid 5 to obtain 40 ml of a reaction liquid. The reaction liquid had a fluorine concentration of 26.4 mM and a tin concentration of 24.9 mM.

Comparative example 8: 9.06 ml of 55% HF was added to 80 ml of pure water and stirred to obtain a fluoride solution. The fluoride solution has a fluorine concentration of 3.36 M. The fluorine concentration at this time is the fluorine concentration at which tin ions initially associate with fluorine. Next, 20 g of tin(II) chloride was added to this hydrofluoric acid solution and dissolved. Then, pure water was added to adjust the total volume to 100 ml, thereby obtaining a comparative example concentrated liquid 6. This comparative example concentrated liquid 6 has a fluorine concentration of 3.00 M and a tin concentration of 0.86 M. The fluorine concentration was equal to or more than three times the tin concentration.

Next, 39.0 ml of pure water was added to 1 ml of the comparative example concentrated liquid 6 to obtain 40 ml of a reaction liquid. The reaction liquid had a fluorine concentration of 74.7 mM and a tin concentration of 21.5 mM.

Comparative example 9: 2.9 ml of 55% HF was added to 80 ml of pure water and stirred to obtain a fluoride solution. The fluoride solution has a fluorine concentration of 1.15 M. The fluorine concentration at this time is the fluorine concentration at which tin ions initially associate with fluorine. Next, 29 g of tin(II) chloride was added to this hydrofluoric acid solution and dissolved. Then, pure water was added to adjust the total volume to 100 ml, thereby obtaining a comparative example concentrated liquid 7. This comparative example concentrated liquid 7 has a fluorine concentration of 0.96 M and a tin concentration of 1.25 M.

Next, 39 ml of pure water was added to 1 ml of the comparative example concentrated liquid 7 to obtain 40 ml of a reaction liquid. The reaction liquid had a fluorine concentration of 23.9 mM and a tin concentration of 31.2 mM. The fluorine concentration was equal to or less than 0.8 times the tin concentration.

Comparative example 10: 17.4 g (corresponding to 0.10 mol) of tin(II) fluoride ($SnF_2$) was added to 80 ml of pure water and dissolved. Then, pure water was added to adjust the total volume to 100 ml, thereby obtaining a comparative example concentrated liquid 8. The fluorine source in the comparative example concentrated liquid 8 is tin(II) fluoride itself. That is, the fluorine concentration at which tin ions initially associate with fluorine is about 2.50 M. The comparative example concentrated liquid 8 has a fluorine concentration of 2.00 M and a tin concentration of 1.00 M.

Next, 39 ml of pure water was added to 1.0 ml of the comparative example concentrated liquid 8 to obtain 40 ml of a reaction liquid. The reaction liquid had a fluorine concentration of 50.0 mM and a tin concentration of 24.9 mM.

Comparative example 11: 17.4 g (corresponding to 0.10 mol) of tin(II) fluoride ($SnF_2$) was added to 80 ml of pure water and dissolved. Then, pure water was added to adjust the total volume to 100 ml, thereby obtaining a comparative example concentrated liquid 8. The fluorine source in the comparative example concentrated liquid 8 is tin(II) fluoride itself. That is, the fluorine concentration at which tin ions initially associate with fluorine is about 2.50 M. The comparative example concentrated liquid 8 has a fluorine concentration of 2.00 M and a tin concentration of 1.00 M.

Next, 32 ml of pure water was added to 8.0 ml of the comparative example concentrated liquid 8 to obtain 40 ml of a reaction liquid. The reaction liquid had a fluorine concentration of 399.7 mM and a tin concentration of 199.9 mM.

Comparative example 12: 5.0 g (corresponding to 0.03 mol) of tin(II) fluoride ($SnF_2$) was added to 80 ml of pure water and dissolved. Then, pure water was added to adjust the total volume to 100 ml, thereby obtaining a comparative example concentrated liquid 9. The fluorine source in the comparative example concentrated liquid 9 is tin(II) fluoride itself. That is, the fluorine concentration at which tin ions initially associate with fluorine is about 0.75 M. The comparative example concentrated liquid 9 has a fluorine concentration of 0.57 M and a tin concentration of 0.29 M.

Next, 0.039 ml of 55% HF and pure water were added to 5.0 ml of the comparative example concentrated liquid 9 to obtain 40 ml of a reaction liquid. The reaction liquid had a fluorine concentration of 103.9 mM and a tin concentration of 35.9 mM.

Comparative example 13: 5.0 g (corresponding to 0.03 mol) of tin(II) fluoride ($SnF_2$) was added to 80 ml of pure water and dissolved. Then, pure water was added to adjust the total volume to 100 ml, thereby obtaining a comparative example concentrated liquid 9. The fluorine source in the comparative example concentrated liquid 9 is tin(II) fluoride itself. That is, the fluorine concentration at which tin ions initially associate with fluorine is about 0.75 M. The comparative example concentrated liquid 9 has a fluorine concentration of 0.57 M and a tin concentration of 0.29 M.

Next, 35 ml of pure water was added to 5.0 ml of the comparative example concentrated liquid 9 to obtain 40 ml of a reaction liquid. The reaction liquid had a fluorine concentration of 71.8 mM and a tin concentration of 35.9 mM.

Comparative example 14: 3.06 ml of 55% HF was added to 80 ml of pure water and stirred to obtain a hydrofluoric acid solution. The concentration of the hydrofluoric acid solution is 1.22 M. The fluorine concentration at this time is the fluorine concentration at which tin ions initially associate with fluorine. Next, 23.2 g of tin(II) chloride was added to this hydrofluoric acid solution and dissolved. Then, pure water was added to adjust the total volume to 100 ml, thereby obtaining a comparative example concentrated liquid 10. This comparative example concentrated liquid 10 has a fluorine concentration of 1.01 M and a tin concentration of 1.00 M.

Next, 0.44 ml of 35% HCl and pure water were added to 1 ml of the comparative example concentrated liquid 10 to obtain 40 ml of a reaction liquid. The reaction liquid had a fluorine concentration of 25.2 mM and a tin concentration of 24.9 mM.

Comparative example 15: 3.06 ml of 55% HF was added to 80 ml of pure water and stirred to obtain a hydrofluoric acid solution. The concentration of the hydrofluoric acid solution is 1.22 M. The fluorine concentration at this time is the fluorine concentration at which tin ions initially associate with fluorine. Next, 23.2 g of tin(II) chloride was added to this hydrofluoric acid solution and dissolved. Then, pure water was added to adjust the total volume to 100 ml, thereby obtaining a comparative example concentrated liquid 10. This comparative example concentrated liquid 10 has a fluorine concentration of 1.01 M and a tin concentration of 1.00 M.

Next, 8.0 ml of KF prepared at 50 g/L and pure water were added to 1 ml of the comparative example concentrated liquid 10 to obtain 40 ml of a reaction liquid. The reaction liquid had a fluorine concentration of 25.2 mM and a tin concentration of 24.9 mM.

Comparative example 16: 3.06 ml of 55% HF was added to 80 ml of pure water and stirred to obtain a hydrofluoric acid solution. The concentration of the hydrofluoric acid solution is 1.22 M. The fluorine concentration at this time is the fluorine concentration at which tin ions initially associate with fluorine. Next, 23.2 g of tin(II) chloride was added to this hydrofluoric acid solution and dissolved. Then, pure water was added to adjust the total volume to 100 ml, thereby obtaining a comparative example concentrated liquid 10. This comparative example concentrated liquid 10 has a fluorine concentration of 1.01 M and a tin concentration of 1.00 M.

Next, 2.0 ml of ascorbic acid prepared at 50 g/L and pure water were added to 1 ml of the comparative example concentrated liquid 10 to obtain 40 ml of a reaction liquid. The reaction liquid had a fluorine concentration of 25.2 mM and a tin concentration of 24.9 mM.

Table 1 below shows the main data for the concentrated liquids of the examples, Table 2 shows the main data for the concentrated liquids of the comparative examples, Table 3 shows the main data for the reaction liquids of the examples, and Table 4 shows the main data for the reaction liquids of the comparative examples. Tables 3 and 4 also show the fluorine concentrations when tin ions in the concentrated liquids initially associate with.

TABLE 1

| | HF as F source, SnCl$_2$ as Sn source | | | | |
|---|---|---|---|---|---|
| | FCq. at the time of associating with Sn (M) | Concentrated Liquid (total volume: 100 ml) | | | |
| | | Concentrated liquid FCq. (M) | Concentrated liquid SnCq. (M) | Other ions Cq. (M) | Sn/F |
| Example 1 | 0.62 | 0.50 | 0.50 | — | 0.99 |
| Example 2 | 0.31 | 0.25 | 0.25 | — | 0.98 |
| Example 3 | 2.32 | 2.00 | 2.00 | — | 1.00 |
| Example 4 | 4.33 | 3.99 | 1.93 | — | 0.48 |
| Example 5 | 4.33 | 3.99 | 1.93 | — | 0.48 |
| Example 6 | 0.62 | 0.50 | 0.50 | — | 0.99 |
| Example 7 | 0.62 | 0.50 | 0.17 | — | 0.33 |
| Example 8 | 3.36 | 2.99 | 1.03 | — | 0.35 |
| Example 9 | 1.22 | 1.01 | 1.20 | — | 1.19 |
| Example 10 | 1.00 | 0.83 | 1.25 | — | 1.50 |
| Example 11 *E1 | 0.00 | 0.00 | 1.00 | — | — |
| Example 12 *E1 | 0.00 | 0.00 | 1.00 | — | — |
| Example 13 *E1 | 0.00 | 0.00 | 1.00 | — | — |
| Example 14 | 1.22 | 1.01 | 1.00 *E2 | BF$_4^{-2}$: 0.40 | 0.96 |
| Example 15 | 2.50 | 1.00 | 1.00 *E3 | NH$_4^{+1}$: 0.50 | 1.00 |

*E1: All the solvents except for 55% HF added
*E2: Sn source is SnCl$_2$ + Sn(BF$_4$)$_2$.
*E3: F source is NH$_4$HF$_2$.

TABLE 2

| | Concentrated Liquid (total volume: 100 ml) | | | | |
|---|---|---|---|---|---|
| | FCq. at the time of associating with Sn (M) | Concentrated liquid FCq. (M) | Concentrated liquid SnCq. (M) | Other ions Cq. (M) | Sn/F |
| Comparative Example 1 | 0.29 | 0.23 | 0.23 | – | 0.99 |
| Comparative Example 2 | 0.26 | 0.23 | 0.23 | – | 0.99 |
| Comparative Example 3 | 0.29 | 0.23 | 0.23 | – | 0.99 |
| Comparative Example 4 | 0.62 | 0.50 | 0.50 | – | 0.99 |
| Comparative Example 5 *C1 | 0.00 | 1.60 | 1.00 | BF$_4^{-2}$: 0.1 mol | 0.63 |
| Comparative Example 6 | 4.33 | 3.99 | 1.93 | – | 0.48 |
| Comparative Example 7 | 0.00 | 0.00 | 1.00 | – | – |
| Comparative Example 8 | 3.36 | 3.00 | 0.86 | – | 0.29 |
| Comparative Example 9 | 1.15 | 0.96 | 1.25 | – | 1.30 |
| Comparative Example 10 *C2 | 2.50 | 2.00 | 1.00 | – | 0.50 |
| Comparative Example 11 *C2 | 2.50 | 2.00 | 1.00 | – | 0.50 |
| Comparative Example 12 *C2 | 0.75 | 0.57 | 0.29 | – | 0.50 |
| Comparative Example 13 *C2 | 0.75 | 0.57 | 0.29 | – | 0.50 |
| Comparative Example 14 | 1.22 | 1.01 | 1.00 | – | 0.99 |
| Comparative Example 15 | 1.22 | 1.01 | 1.00 | – | 0.99 |
| Comparative Example 16 | 1.22 | 1.01 | 1.00 | – | 0.99 |

*C1: Sn(BF$_4$)$_2$ alone
*C2: SnF$_2$ alone

TABLE 3

| | Concentrated Liquid | | | Reaction Liquid (total volume: 40 ml) | | | |
|---|---|---|---|---|---|---|---|
| | FCq. at the time of associating with Sn (M) | Sn/F | Concentrated liquid volume (ml) | Post-added volume (ml) | Reaction liquid FCq. (mM) | Reaction liquid SnCq. (mM) | Sdr |
| Example 1 | 0.62 | 0.99 | 5 | — | 63.1 | 62.3 | 1.32E−05 |
| Example 2 | 0.31 | 0.98 | 4 | — | 25.4 | 24.9 | 5.78E−05 |
| Example 3 | 2.32 | 1.00 | 4 | — | 199.6 | 199.9 | 4.18E−05 |
| Example 4 | 4.33 | 0.48 | 6 | — | 598.7 | 2902.0 | 7.84E−05 |
| Example 5 | 4.33 | 0.48 | 25 | — | 2494.4 | 1209.0 | 8.93E−05 |
| Example 6 | 0.62 | 0.99 | 0.8 | — | 10.1 | 10.0 | 6.57E−05 |
| Example 7 | 0.62 | 0.33 | 0.8 | — | 10.1 | 3.4 | 2.24E−05 |
| Example 8 | 3.36 | 0.35 | 1 | — | 74.7 | 25.8 | 7.22E−05 |
| Example 9 | 1.22 | 1.19 | 1 | — | 25.2 | 30.1 | 4.42E−06 |
| Example 10 | 1.00 | 1.50 | 1 | 0.013 *E4 | 31.4 | 31.2 | 2.09E−05 |
| Example 11 *E1 | 0.00 | — | 1 | 0.032 *E4 | 26.4 | 24.9 | 1.71E−05 |
| Example 12 *E1 | 0.00 | — | 1 | 0.09 *E4 | 74.2 | 24.9 | 8.51E−06 |
| Example 13 *E1 | 0.00 | — | 1 | 0.025 *E4 | 20.6 | 24.9 | 2.06E−05 |
| Example 14 *E2 | 1.22 | 0.96 | 5 | — | 126.2 | 50.0 | 3.42E−05 |
| Example 15 *E3 | 2.50 | 1.00 | 5 | — | 125.0 | 124.7 | 9.95E−05 |

*E1: All the solvents except for 55% HF added later are ethanol.
*E2: Sn source is $SnCl_2$ + $Sn(BF_4)_2$.
*E3: F source is $NH_4HF_2$.
*E4: 55% HF

TABLE 4

| | Concentrated Liquid | | | Reaction Liquid (total volume: 40 ml) | | | | |
|---|---|---|---|---|---|---|---|---|
| | Sn会合時 FCq. (M) | Sn/F | Concentrated liquid volume (ml) | Post-added volume (ml) | Additive molar concentration | Reaction liquid FCq. (mM) | Reaction liquid SnCq. (mM) | Sdr |
| Comparative Example 1 | 0.29 | 0.99 | 10.4 | — | — | 60.0 | 59.2 | 5.36E−03 |
| Comparative Example 2 | 0.26 | 0.99 | 1.8 | — | — | 10.4 | 10.3 | 8.47E−03 |
| Comparative Example 3 | 0.29 | 0.99 | 34.5 | — | — | 199.1 | 196.5 | 2.36E−03 |
| Comparative Example 4 | 0.62 | 0.99 | 0.65 | — | — | 8.2 | 8.1 | 5.88E−04 |
| Comparative Example 5 *C1 | 0 | 0.63 | 5 | — | — | 200.1 | 125.1 | Film formation failure |
| Comparative Example 6 | 4.33 | 0.48 | 28 | — | — | 2793.7 | 1354.1 | Substrate dissolution |
| Comparative Example 7 | 0.0 | — | 1 | 0.032 *C3 | | 26.4 | 24. | 2.61E−03 |
| Comparative Example 8 | 3.4 | 0.29 | 1 | | | 74.7 | 21.5 | 6.66E−04 |
| Comparative Example 9 | 1.2 | 1.30 | 1 | | | 23.9 | 31.2 | 7.46E−04 |
| Comparative Example 10 *C2 | 0.0 | 0.50 | 1 | — | — | 50.0 | 24.9 | 8.94E−03 |
| Comparative Example 11 *C2 | 0.0 | 0.50 | 8 | — | — | 399.7 | 199.9 | 4.29E−03 |
| Comparative Example 12 *C2 | 1.4 | 0.50 | 5 | 0.039 *C3 | — | 103.9 | 35.9 | 9.89E−04 |
| Comparative Example 13 *C2 | 1.4 | 0.50 | 5 | — | — | 71.8 | 35.9 | 6.73E−04 |
| Comparative Example 14 | 1.22 | 0.99 | 1 | 0.44 *C4 | HCl: 125 mM | 25.2 | 24.9 | 3.72E−03 |
| Comparative Example 15 | 1.22 | 0.99 | 1 | 8.0 *C5 | KF: 172 mM | 25.2 | 24.9 | Film formation failure |
| Comparative Example 16 | 1.22 | 0.99 | 1 | 2.0 *C6 | ascorb: 14 mM | 25.2 | 24.9 | Film formation failure |

*C1: $Sn(BF_4)_2$ alone
*C2: $SnF_2$ alone
*C3: 55% HF
*C4: 35% HCl
*C5: KF prepared at 50 g/L
*C6: Ascorbic acid (=ascorb) prepared at 50 g/L The following description is given with reference to Table 3 and Table 4. As shown in Examples 1 to 10, when the fluorine concentration of the fluoride solution at which tin ions initially associate with fluorine is 0.3 M or more, it can be said the developed interfacial area ratio Sdr is less than $1 \times 10^{-4}$, and a uniform catalyst layer is formed. Under such a condition, a suitable catalyst layer could be formed when the fluorine concentration of the reaction liquid as the final solution fell within a range of 10 mM to 2.49 M.

In Comparative example 1 in Table 4, the fluorine concentration of the reaction liquid was almost the same as that in Example 1 (60 mM). However, the developed interfacial area ratio Sdr was $1 \times 10^{-4}$ or more. Similarly, although Comparative example 2 and Comparative example 3 had almost the same fluorine concentration as those in Example 6 and Example 3, respectively (10 mM and 200 mM), the developed interfacial area ratios Sdr of the comparative examples were both $1 \times 10^{-4}$ or more. In Comparative example 7, fluorine ions were not present when the concentrated liquid was prepared, and fluorine ions were added later using hydrofluoric acid when the reaction liquid was prepared. In this case, the developed interfacial area ratio Sdr was also $1\times10^{-4}$ or more.

It is speculated that, if the concentration of the fluoride solution at which tin ions initially associate with fluoride is low as described above, the divalent tin is oxidized to tetravalent tin by oxygen dissolved in the solution, and the resulting tin precipitates as fine particles and accumulates on the substrate surface without contributing to the generation of the catalyst layer, negatively affecting the developed interfacial area ratio Sdr (the numerical value thereof becomes higher). In other words, in order to reduce the generation of the tetravalent tin during a film formation period of 4 hours or more to a degree that does not affect the evenness of the catalyst layer that is subsequently formed, it is necessary to initially dissolve the tin in a fluoride solution of 0.3 M or more.

Examples 11 to 13 are examples in which ethanol was used as the solvent. In these cases, the dissolved oxygen is only mixed in from water contained in the hydrofluoric acid added later, and no oxidation due to the dissolved oxygen in the concentrated liquid occurs. Thus, the developed interfacial area ratio Sdr constantly had a value of about $1\times10^{-5}$.

In Comparative example 4, the fluorine concentration of the fluoride solution at which tin ions initially associate with fluorine was 0.62 M. From the viewpoint of the above-described examples, the developed interfacial area ratio Sdr was predicted to be less than $1\times10^{-4}$. However, the actual developed interfacial area ratio Sdr was $1\times10^{-4}$ or more. Based on this fact, it is speculated that, even when the fluorine concentration of the fluoride solution at which tin ions initially associate with fluorine is 0.62 M, if the concentration of the reaction liquid subsequently prepared is too low (less than 10 mM), it is difficult to reduce the generation of tetravalent tin to a degree that does not affect the evenness of the catalyst layer during a film formation period of 4 hours or more.

On the other hand, in Comparative example 6 in which the fluorine concentration of the reaction liquid was 2.5 M or more, the glass substrate itself was dissolved, making it difficult to form the film. Considering that the film could be formed at about 2.5 M in Example 5, the fluorine concentration in the reaction liquid is thought to be limited to 2.5 M.

In Example 7, the concentrated liquid was prepared as a fluoride ion-rich solution relative to tin ions, and in Example 9, the concentrated liquid was prepared as a fluoride ion-poor solution relative to tin ions. On the other hand, in Comparative example 8, the fluoride ion concentration was three times or more that of tin ions, and in Comparative example 9, the fluoride ion concentration was 80% or less that of tin ions. When the fluoride ion concentration was too high relative to that of tin ions, the tin ions became diluted, and, as a result, unevenness in the catalyst layer became more noticeable the developed interfacial area ratio Sdr was $1\times10^{-4}$ or more.) When the fluoride ion concentration was too low relative to that of tin ions (the tin ion concentration was high), the concentrated liquid itself became sticky, and the catalyst layer formed later had unevenness (the developed interfacial area ratio Sdr was $1\times10^{-4}$ or more).

In Example 14, tin(II) tetrafluoroborate ($Sn(BF_4)_2$) was used, and in Comparative example 5, only tin(II) tetrafluoroborate ($Sn(BF_4)_2$) was used. From these comparisons, it can be concluded that tin(II) tetrafluoroborate is not suitable as a fluorine source for the liquid phase film formation method of the present invention.

In Example 15, ammonium hydrogen difluoride ($NH_4HF_2$) was used. The developed interfacial area ratio Sdr is less than $1\times10^{-4}$, and thus it can be concluded that ammonium hydrogen difluoride ($NH_4HF_2$) is suitable as a fluorine source for the liquid phase film formation method of the present invention.

In Comparative example 14, the fluorine concentration of the fluoride solution at which tin ions initially associate with fluorine was 0.3 M or more. In this case, hydrochloric acid was added later during preparation of the reaction liquid. The developed interfacial area ratio Sdr was $1\times10^{-4}$ or more, and as a result, the unevenness of the catalyst layer subsequently formed was noticeable. Hydrochloric acid is a material that is often used in a liquid phase deposition (LPD) method (hereinafter, also referred to as "LPD method") that uses fluorine. However, hydrochloric acid negatively affected the surface roughness at the level required by the present invention (film formation for 4 hours). Judging from these results, it can be said that the present invention with the specified developed area ratio achieves a lower surface roughness (higher surface quality) than the conventional LPD method.

In Comparative example 15 and Comparative example 16, the fluorine concentration of the fluoride solution at which tin ions initially associate with fluorine was 0.3 M or more. In these cases, KF (Comparative example 15) and ascorbic acid (Comparative example 16) were added later during preparation of the reaction liquids. In both cases, it was difficult to form films. It is concluded that these additives are not suitable for the film formation method of the present invention.

As described above, when producing the tin oxide film using the LPD method, the stable divalent tin solution (reaction liquid) could be obtained by preparing the reaction liquid by diluting the concentrated liquid, and the surface roughness of the catalyst layer (Pd) on the tin oxide film could be reduced to a developed interfacial area ratio of less than $1\times10^{-4}$. That is, a catalyst layer without unevenness could be formed. More specifically, when preparing the concentrated liquid, the fluorine concentration was adjusted to 0.3 M or more when tin(II) chloride was first added, and the reaction liquid was prepared by diluting the concentrated liquid, so that the developed interfacial area ratio could be reduced to less than $1\times10^{-4}$. As a result, the film can be formed without negative effects on the surface roughness even if the film is formed for a long period of time.

This is considered as a method for preventing tin(II) chloride from being hydrolyzed by oxygen dissolved in the reaction liquid. Thus, even if the fluorine concentration when tin(II) chloride is first added is less than 0.3 M, as long as a solvent not containing dissolved oxygen, such as ethanol, is used, the high surface quality (the low developed interfacial area ratio) can be maintained during a long film formation period.

It is noted that tin(II) chloride was suitably used as the divalent tin, and hydrogen fluoride was suitably used as the fluorine source. Furthermore, as the fluorine source, in addition to hydrofluoric acid, ammonium hydrogen difluoride and ammonium fluoride could be used.

INDUSTRIAL APPLICABILITY

A method for forming a tin oxide multilayer film with a catalyst layer according to the present invention can obtain a uniform tin oxide multilayer film without unevenness.

The invention claimed is:

1. A method for forming a tin oxide multilayer film with a catalyst layer, the method comprising:
    dissolving a fluoride in water to form a first liquid having a concentration of 0.3 M or more;
    preparing a concentrated liquid by mixing the first liquid with a tin compound, the concentrated liquid being prepared such that a fluorine ion concentration derived from the fluoride is 0.8 times or more, and 3 times or less, than a divalent tin ion concentration derived from the tin compound;
    diluting the concentrated liquid with water to prepare a reaction liquid that is a stable divalent tin solution having the fluorine ion concentration of 0.01M to 2.5M;
    immersing a substance to be treated in the reaction liquid to form a tin oxide layer having a thickness of 2 nm or more and 60 nm or less on a surface of the substance to be treated; and
    immersing the substance to be treated having the tin oxide layer formed on the surface in a catalyst solution containing catalyst metal ions to form a catalyst layer including the catalyst metal on the tin oxide layer; wherein
    the catalyst metal is a noble metal.

2. The method for forming a tin oxide multilayer film with a catalyst layer according to claim 1, wherein the fluoride is one or more of hydrofluoric acid, ammonium hydrogen fluoride, and ammonium fluoride.

3. The method for forming a tin oxide multilayer film with a catalyst layer according to claim 1, wherein the noble metal is selected from the group consisting of palladium, platinum, gold, and silver.

4. The method for forming a tin oxide multilayer film with a catalyst layer according to claim 1, wherein the substance to be treated is an insulator.

5. The method for forming a tin oxide multilayer film with a catalyst layer according to claim 4, wherein the insulator is a material selected from the group consisting of resin, ceramics, glass, and silicon.

6. A method for forming a tin oxide multilayer film with a catalyst layer, the method comprising:
    dissolving a tin compound in a polar solvent other than water to prepare a concentrated liquid;
    diluting the concentrated liquid with a fluoride solution to prepare a reaction liquid that is a stable divalent tin solution having the fluorine ion concentration derived from the fluoride being 0.01M to 2.5M;
    immersing a substance to be treated in the reaction liquid to form a tin oxide layer having a thickness of 2 nm or more and 60 nm or less on a surface of the substance to be treated; and
    immersing the substance to be treated having the tin oxide layer formed on the surface in a catalyst solution containing catalyst metal ions to form a catalyst layer including the catalyst metal on the tin oxide layer; wherein
    the catalyst metal is a noble metal.

7. The method for forming a tin oxide multilayer film with a catalyst layer according to claim 6, wherein the fluoride is one or more of hydrofluoric acid, ammonium hydrogen fluoride, and ammonium fluoride.

8. The method for forming a tin oxide multilayer film with a catalyst layer according to claim 6, wherein the noble metal is selected from the group consisting of palladium, platinum, gold, and silver.

9. The method for forming a tin oxide multilayer film with a catalyst layer according to claim 6, wherein the substance to be treated is an insulator.

10. The method for forming a tin oxide multilayer film with a catalyst layer according to claim 9, wherein the insulator is a material selected from the group consisting of resin, ceramics, glass, and silicon.

* * * * *